("(12) United States Patent  
Ikuta (10) Patent No.: US 9,781,911 B2
(45) Date of Patent: Oct. 10, 2017

(54) DUAL-BEARING REEL (71) Applicant: Shimano Inc., Sakai, Osaka (JP)

(72) Inventor: Takeshi Ikuta, Osaka (JP)

(73) Assignee: Shimano Inc., Osaka (JP)

( * ) Notice: Subject to any disclaimer, the term of this patent is extended or adjusted under 35 U.S.C. 154(b) by 384 days.

(21) Appl. No.: 14/467,528

(22) Filed: Aug. 25, 2014

(65) Prior Publication Data

US 2015/0090822 A1 Apr. 2, 2015

(30) Foreign Application Priority Data

Oct. 1, 2013 (JP) ................................. 2013-206303

(51) Int. Cl.
*A01K 89/01* (2006.01)
*A01K 89/015* (2006.01)

(52) U.S. Cl.
CPC .................................. *A01K 89/015* (2013.01)

(58) Field of Classification Search
CPC .............. A01K 89/015; A01K 89/0186; A01K 89/0189; A01K 89/0191; A01K 89/01931
See application file for complete search history.

(56) References Cited

U.S. PATENT DOCUMENTS

| 5,746,381 | A | * | 5/1998 | Miyazaki | ............. | A01K 89/015 |
| | | | | | | 192/69.63 |
| 5,904,310 | A | * | 5/1999 | Miyazaki | ............. | A01K 89/015 |
| | | | | | | 192/107 R |
| 7,789,336 | B1 | * | 9/2010 | Nakagawa | ........... | A01K 89/015 |
| | | | | | | 242/317 |
| 2007/0114314 | A1 | * | 5/2007 | Bin Ahmad | ......... | A01K 89/033 |
| | | | | | | 242/245 |
| 2010/0288866 | A1 | * | 11/2010 | Nakagawa | ......... | A01K 89/0155 |
| | | | | | | 242/289 |
| 2011/0180647 | A1 | * | 7/2011 | Niitsuma | ............. | A01K 89/033 |
| | | | | | | 242/307 |
| 2012/0018562 | A1 | * | 1/2012 | Takamatsu | ........... | A01K 89/015 |
| | | | | | | 242/307 |
| 2012/0056028 | A1 | * | 3/2012 | Kawasaki | ............ | A01K 89/033 |
| | | | | | | 242/267 |

(Continued)

FOREIGN PATENT DOCUMENTS

| JP | 10-136849 A | 5/1998 |
| JP | 2001-95441 A | 4/2001 |
| JP | 2012-24037 A | 2/2012 |

*Primary Examiner* — Emmanuel M Marcelo
(74) *Attorney, Agent, or Firm* — Global IP Counselors, LLP (57) ABSTRACT A clutch mechanism includes a clutch pin, a pinion gear, a first bearing, a second bearing and a clearance adjusting part. The pinion gear is axially movable to an on-position that causes the pinion gear to engage with the clutch pin and be unitarily rotatable with the spool shaft and an off-position that causes the pinion gear to disengage from the clutch pin. The first bearing is disposed on an outer peripheral surface of a first support part of the pinion gear. The second bearing is disposed on an outer peripheral surface of a second support part of the pinion gear. The clearance adjusting part is configured to partially reduce a clearance between an inner peripheral surface of a through hole and the outer peripheral surface of the spool shaft at the clearance adjusting part in an on-state of the clutch mechanism.

15 Claims, 7 Drawing Sheets

(56) References Cited

U.S. PATENT DOCUMENTS

| | | | |
|---|---|---|---|
| 2012/0128414 A1* | 5/2012 | Hiraoka | A01K 89/0114 403/354 |
| 2013/0075218 A1* | 3/2013 | Takechi | A01K 89/015 192/55.1 |
| 2013/0153700 A1* | 6/2013 | Niitsuma | A01K 89/015 242/310 |
| 2013/0193250 A1* | 8/2013 | Ikebukuro | A01K 89/015 242/261 |

* cited by examiner

DUAL-BEARING REEL

CROSS-REFERENCE TO RELATED APPLICATIONS

This application claims priority to Japanese Patent Application No. 2013-206303 filed on Oct. 1, 2013, the entirety of which is hereby incorporated by reference in its entirety.

BACKGROUND OF THE INVENTION

Field of the Invention

The present invention relates to a dual-bearing reel including a clutch mechanism configured to be switchable between an on-state that couples a handle rotatably mounted to a lateral part of a reel unit and a spool rotatably supported by the reel unit and an off-state that decouples the handle and the spool.

Background Information

A dual-bearing reel can include a clutch mechanism configured to be switchable between an on-state that couples a handle and a spool and an-off state that decouples the handle and the spool. Such a well-known clutch mechanism is generally disposed between a spool shaft and a pinion gear (e.g., see Japan Laid-open Patent Application Publication No. JP-A-2012-24037).

The clutch mechanism described in the Publication No. JP-A-2012-24037 includes a clutch pin and an engaging part. The clutch pin is mounted to the spool shaft. The engaging part is formed in the pinion gear through which the spool shaft penetrates. The engaging part has an engaging groove, for instance, to be engaged with the clutch pin.

To enhance fishing-line winding efficiency, the pinion gear composing a part of the clutch mechanism is supported at the both ends thereof by a pair of bearings, while being rotatable and axially movable. With the structure, meshing of gear tooth surfaces becomes stabled between the pinion gear and another gear member, and transmission efficiency of gears (i.e., fishing-line winding efficiency) is enhanced. It should be herein noted that the spool shaft inevitably makes contact with the inner periphery of the pinion gear in the clutch-off state, unless the spool shaft and the pinion gear are concentrically disposed with high accuracy. In casting, the contact between the spool shaft and the pinion gear acts as rotational resistance, and negatively affects the flying distance of a terminal tackle. To cope with the drawback, an appropriate clearance is produced between the outer periphery of the spool shaft and the inner periphery of the pinion gear in the clutch mechanism described in the Publication No. JP-A-2012-24037.

In the technology of the Publication No. JP-A-2012-24037, the pinion gear is supported at the both ends thereof, while being disposed on the outer peripheral side of the spool shaft through a clearance. In such a dual-bearing reel, the clutch pin and the engaging part intermittently make contact with each other due to the relative slant of the spool shaft and the pinion gear when a fish bites the terminal tackle and the fishing line is reeled in. Thus, smooth rotation of the handle is made difficult. Further, the clutch pin and the engaging part are exposed to the outer periphery of the pinion gear. Therefore, click sounds are likely to be produced by intermittent contacts and make an angler annoying.

It is an object of the present invention to inhibit occurrence of intermittent contacts between a clutch pin and an engaging part in winding a fishing line.

SUMMARY OF THE INVENTION

A dual-bearing reel according to the present invention is a type of reel configured to forwardly reel out a fishing line, and includes a reel unit, a handle rotatably mounted to a lateral part of the reel unit, a spool rotatably supported by the reel unit, and a clutch mechanism switchable between an on-state of coupling the handle and the spool and an off-state of decoupling the handle and the spool. The clutch mechanism includes a clutch pin, a pinion gear, a first bearing, a second bearing and a clearance adjusting part. The clutch pin is disposed in and radially protrudes from a spool shaft to Which the spool is mounted in a unitarily rotatable state. The pinion gear has a through hole enabling the spool shaft to penetrate therethrough and an engaging part capable of being engaged with the clutch pin. The pinion gear is rotatable in conjunction with rotation of the handle, and is axially movable to an on-position and an off-position. The on-position causes the pinion gear to be engaged with the clutch pin and be unitarily rotatable with the spool shaft, whereas the off-position causes the pinion gear to be disengaged from the clutch pin. The first bearing serves as a member through which the pinion gear is rotatably and axially movably supported by the reel unit. The first bearing is disposed on an outer peripheral surface of a first end of the pinion gear. The first end is herein disposed on the same side as the spool. The second bearing serves as a member through which the pinion gear is rotatably and axially movably supported by the reel unit. The second bearing is disposed on an outer peripheral surface of a second end of the pinion gear. The second end is herein disposed on the opposite side of the first end. The clearance adjusting part is formed on at least either of an inner peripheral surface of the through hole and an outer peripheral surface of the spool shaft, while being located between the inner peripheral surface of the through hole and the outer peripheral surface of the spool shaft. The clearance adjusting part is configured to partially reduce a clearance to be produced between the inner peripheral surface of the through hole and the outer peripheral surface of the spool shaft in a position of the clearance adjusting part in the on-state of the clutch mechanism.

In the present dual-bearing reel, the clearance between the inner peripheral surface of the pinion gear and the outer peripheral surface of the spool shaft is configured to be partially reduced by the clearance adjusting part in the on-state of the clutch mechanism that the clutch pin of the spool shaft is engaged with the engaging part of the pinion gear. Thus, the clearance between the pinion gear and the spool shaft is reduced in the on-state of the clutch mechanism. It is thereby possible to inhibit occurrence of intermittent contacts between the clutch pin and the engaging part, which is attributed to relative slanting of the pinion gear and the spool shaft. By contrast, in the off-state of the clutch mechanism, the clearance between the pinion gear and the spool shaft is not partially reduced in the position of the clearance adjusting part. Hence, casting is not negatively affected by the off-state of the clutch mechanism.

The clearance adjusting part may be formed on a region, located on the same side as the spool, of the outer peripheral surface of the spool shaft. In the present structure, the clearance adjusting part is formed on the spool shaft. Hence, the clearance adjusting part can be easily formed, while the through hole of the pinion gear can be simply formed.

The spool shaft may have a first shaft part and a second shaft part. The first shaft part enables the clutch pin to penetrate therethrough. The second shaft part has a diameter less than that of the first shaft part, and extends from the first shaft part in a direction away from the spool. Further, the through hole may have a first aperture part and a second aperture part. The first aperture part enables the first shaft part to be disposed therein in the on-state of the clutch mechanism. The second aperture part has a diameter less than that of the first aperture part, and enables the second shaft part to be disposed therein in the on-state of the clutch mechanism. Yet further, the clearance adjusting part may be formed on a region, located on the same side as the first shaft part, of an outer peripheral surface of the second shaft part. The clearance adjusting part may have a diameter that is greater than the diameter of the second shaft part and is less than the diameter of the second aperture part. According to the present structure, in the on-state of the clutch mechanism, the second shaft part and the second aperture part are configured to be opposed to each other, while the clearance adjusting part, which is formed on the first-shaft-part side region of the outer peripheral surface of the second shaft part, is configured to be opposed to the second aperture part. Thus, the clearance between the clearance adjusting part and the second aperture part becomes less than the clearance between the second shaft part and the second aperture part. By contrast, in the off-state of the clutch mechanism, the first aperture part is enabled to be disposed about the clearance adjusting part, whereas the second aperture part is enabled to be disposed about the second shaft part. In the present structure, a large clearance is produced between the pinion gear and the spool shaft. The spool shaft is thereby less likely to make contact with the pinion gear. Thus, the rotational resistance of the spool shaft is reduced in casting, and a terminal tackle can be thrown far.

The engaging part may have a plurality of engaging grooves formed on an end surface of the pinion gear, while being circumferentially aligned. The end surface is herein disposed on the same side as the spool. At least two of the engaging grooves are configured to be engaged with the clutch pin in the on-state of the clutch mechanism. In the present structure, the clutch pin can be engaged with the engaging grooves in a plurality of rotational phases of the pinion gear.

In the position of the clearance adjusting part, the clearance between the inner peripheral surface of the through hole and the outer peripheral surface of the spool shaft is configured to fall in a range of greater than or equal to 0.02 mm and less than or equal to 0.15 mm in the on-state of the clutch mechanism. In the present structure, the clearance formed in the position of the clearance adjusting part is small. Hence, even when load acting on the spool varies, the rotation of the spool shaft becomes further less likely to vary with respect to the rotation of the pinion gear. Therefore, even when load varies in winding the fishing line, it is possible to further inhibit occurrence of intermittent contacts between the clutch pin and the engaging part.

In the position of the clearance adjusting part, the clearance between the inner peripheral surface of the through hole and the outer peripheral surface of the spool shaft in the off-state of the clutch mechanism is configured to be greater than the clearance between the inner peripheral surface of the through hole and the outer peripheral surface of the spool shaft in the on-state of the clutch mechanism. In the present structure, the clearance is increased in the off-state of the clutch mechanism. Hence, the rotational resistance of the spool shaft is reduced in casting, and the terminal tackle can be thrown far.

According to the present invention, when the clutch mechanism is set in the on-state, the clearance between the pinion gear and the spool shaft is reduced. The spool shaft thereby becomes less likely to slant relatively to the pinion gear. Accordingly, it is possible to inhibit occurrence of intermittent contacts between the clutch pin and the engaging part.

BRIEF DESCRIPTION OF THE DRAWINGS

Referring now to the attached drawings which form a part of this original disclosure.

DETAILED DESCRIPTION OF THE EMBODIMENTS

Figure 1:
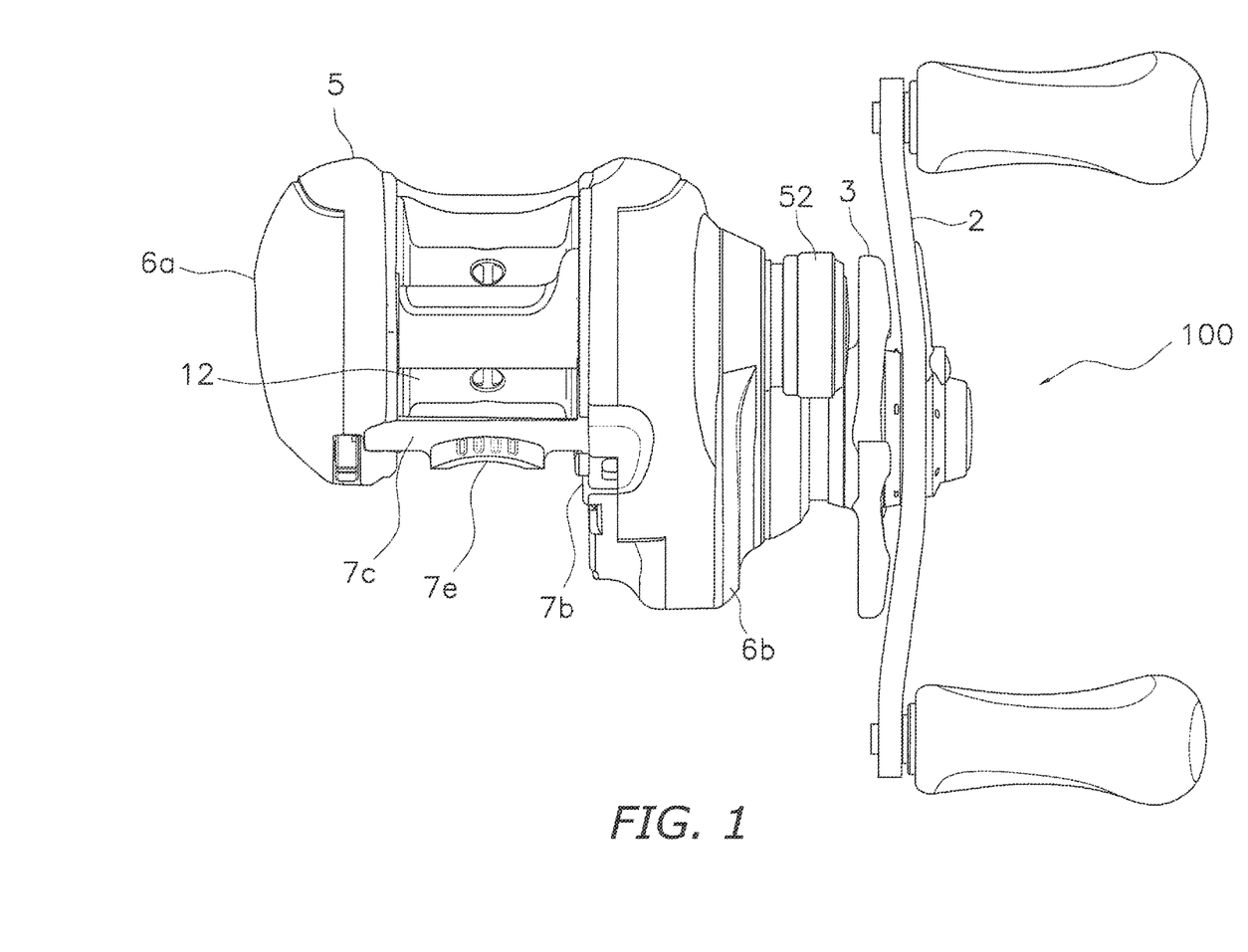
FIG. 1 is a rear view of a dual-bearing reel according to an exemplary embodiment of the present invention.
Figure 2:
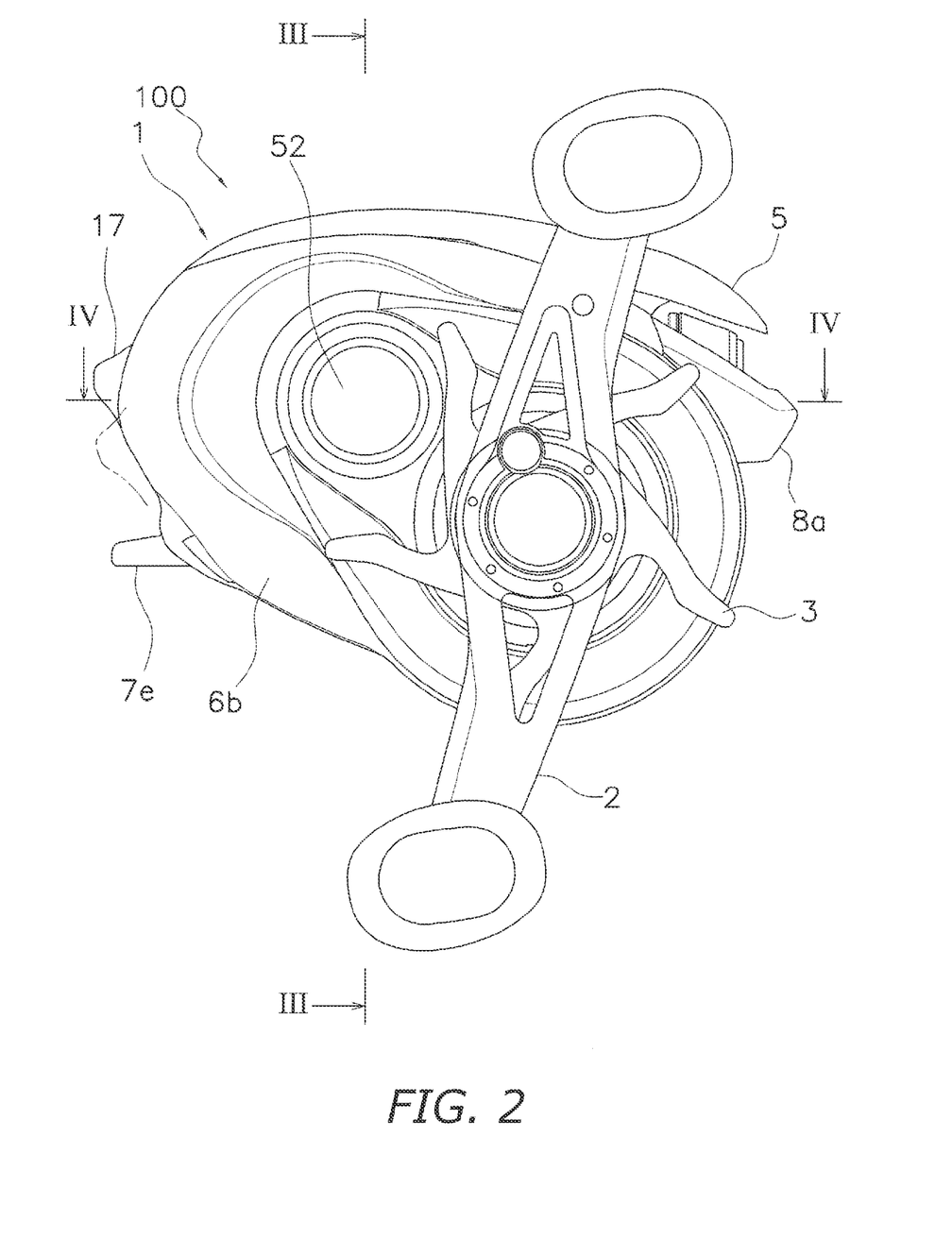
FIG. 2 is a side view of the dual-bearing reel seen from a handle side.
Figure 3:
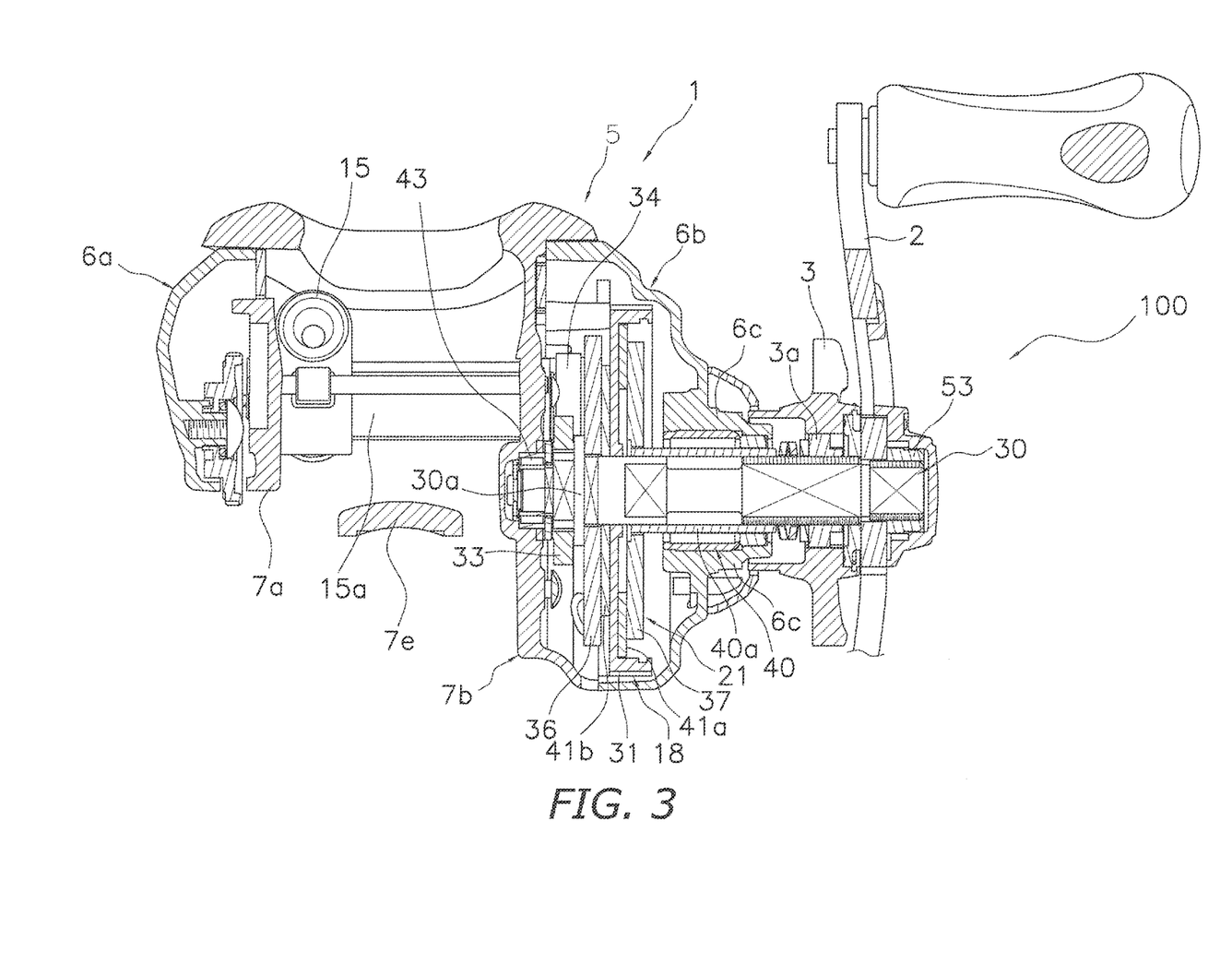
FIG. 3 is a cross-sectional view of FIG. 2 taken along a cutaway line III-III.
Figure 4:
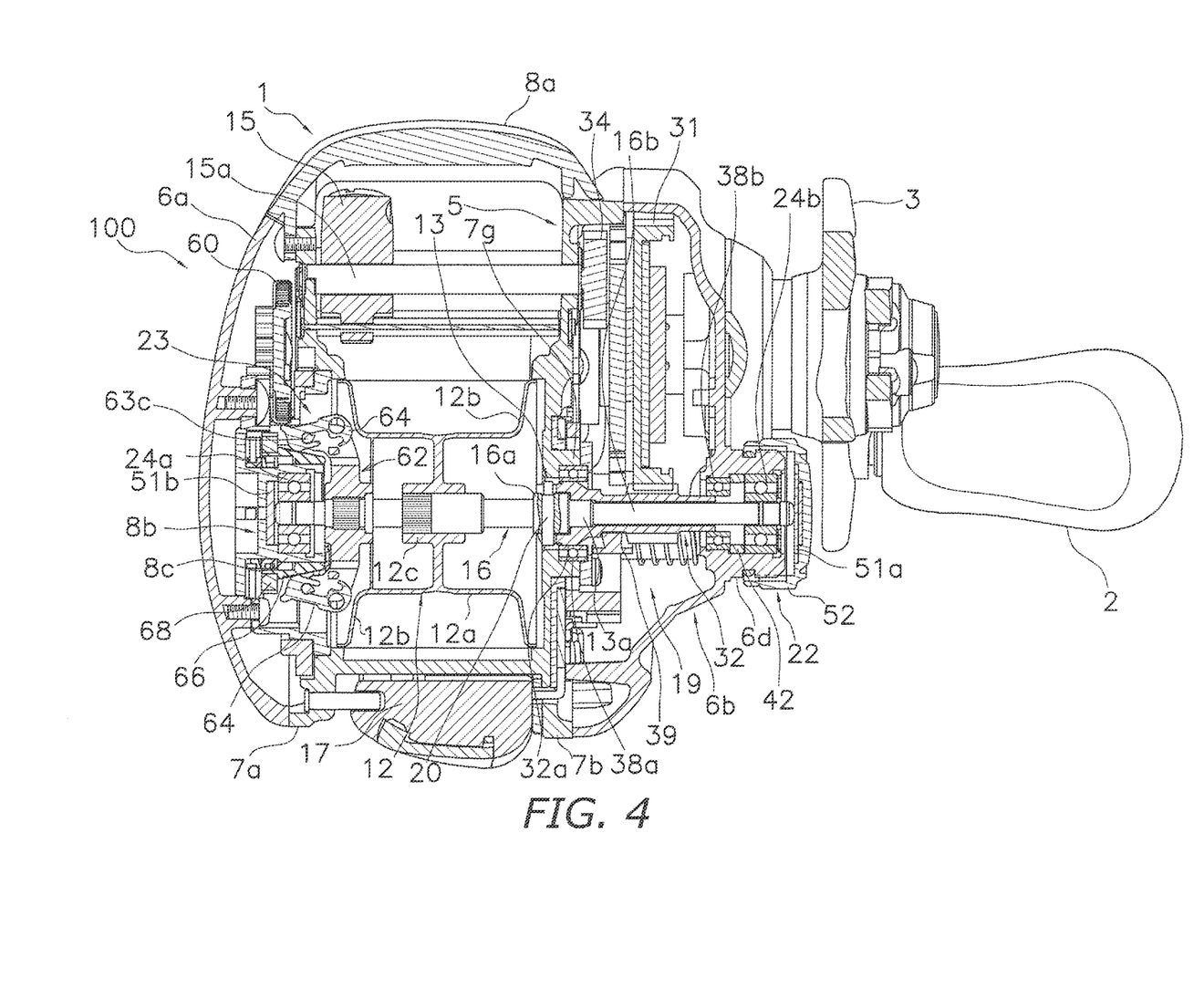
FIG. 4 is a cross-sectional view of FIG. 2 taken along a cutaway line IV-IV.

As illustrated in FIGS. 1 and 2, a dual-bearing reel 100 employing an exemplary embodiment of the present invention is a compact low-profile reel for bait-casting. The dual-bearing reel 100 includes a reel unit 1, a handle 2 for spool rotation and a star drag 3 for drag force regulation. The handle 2 is disposed laterally to the reel unit 1. The star drag 3 is disposed on the same side as the reel unit 1 with respect to the handle 2. As illustrated in FIGS. 3 and 4, the dual-bearing reel 100 further includes a spool 12 for winding a fishing line, a spool shaft 16, a rotation transmission mechanism 18, a clutch mechanism 13 and a drag mechanism 21.

<Reel Unit>

As illustrated in FIGS. 1, 3, 4 and 5, the reel unit 1 includes a frame 5, a first side cover 6a and a second side cover 6b. The first and second side covers 6a and 6b cover the lateral sides of the frame 5. The reel unit 1 further includes a front cover 8a and a shaft strut portion 8b. The front cover 8a covers the front side of the frame 5. The shaft strut portion 8b is fixed to the first side cover 6a by screws or so forth.

The frame 5 includes a first side plate 7a, a second side plate 7b and a plurality of coupling parts 7c. The first side plate 7a is disposed on the opposite side of the handle 2. The second side plate 7b is disposed on the same side as the handle 2, while being opposed to the first side plate 7a. The coupling parts 7c couple the first side plate 7a and the second side plate 7b. The first side plate 7a has an opening 7d bored to enable the spool 12 to pass therethrough. The shaft strut portion 8b is detachably coupled to the opening 7d. The upper side coupling part of the coupling parts 7c is used as a thumb rest. The lower side coupling part of the coupling parts 7c is integrally formed with a fishing-rod attachment part 7e.

Figure 5:
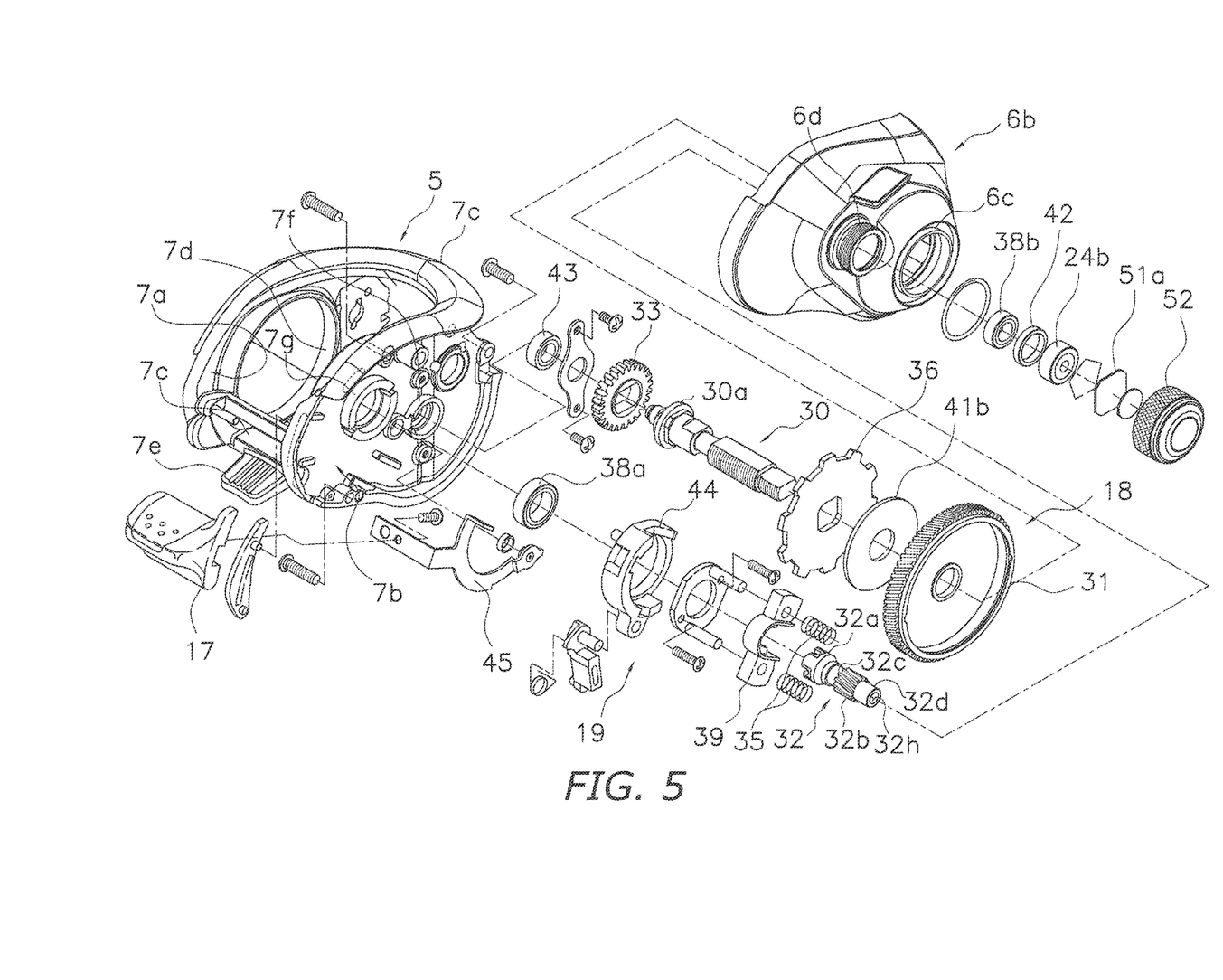
FIG. 5 is an exploded perspective view including a rotation transmission mechanism and a clutch mechanism.

The spool 12 for winding the fishing line is rotatably and detachably mounted between the first and second side plates 7a and 7b of the reel unit 1. As illustrated in FIG. 5, a first boss 7f and a second boss 7g are formed on the second side plate 7b. Each of the first and second bosses 7f and 7g has a through hole. The first boss 7f is provided for supporting the base end of a drive shaft 30 (to be described) onto which the handle 2 is coupled such that the drive shaft 30 is rotatable. The second boss 7g is provided for supporting a pinion gear 32 such that the pinion gear 32 is rotatable and axially movable.

As illustrated in FIG. 4, the first side cover 6a is detachably coupled to the first side plate 7a through the shaft strut portion 8b. As illustrated in FIG. 5, the second side cover 6b has a third boss 6c and a fourth boss 6d. The third boss 6c rotatably supports the drive shaft 30. The fourth boss 6d supports the pinion gear 32 and the spool shaft 16 onto which the spool 12 is fixed.

As illustrated in FIG. 4, the shaft strut portion 8b is a closed-end tubular member. The shaft strut portion 8b has a tubular bearing accommodating part 8c in the inner peripheral part thereof. The bearing accommodating part 8c accommodates a bearing 24a in the interior thereof. The bearing 24a supports one end of the spool shaft 16.

As illustrated in FIGS. 3 and 4, the spool 12, a level wind mechanism 15 and a clutch operating member 17 are disposed between the first side plate 7a and the second side plate 7b. The level wind mechanism 15 is configured to evenly wind the fishing line about the spool 12. The clutch operating member 17 serves as a thumb rest in thumbing the fishing line. The clutch operating member 17 is provided for performing an operation of switching the clutch mechanism 13 between an on-state and an off-state by pivoting about the spool shaft 16. The clutch operating member 17 is configured to pivot between a clutch-on position and a clutch-off position. In FIG. 2, the clutch-on position is depicted with a solid line, whereas the clutch-off position is depicted with a dashed two-dotted line.

As illustrated in FIGS. 3 and 4, the rotation transmission mechanism 18, the clutch mechanism 13, a clutch control mechanism 19, the drag mechanism 21 and a casting control mechanism 22 are disposed between the second side plate 7b and the second side cover 6b. The rotation transmission mechanism 18 is a mechanism configured to transmit the rotation of the handle 2 to the spool 12 and the level wind mechanism 15. The clutch control mechanism 19 is a mechanism configured to engage/disengage and control the clutch mechanism 13 in response to the operation of the clutch operating member 17. As illustrated in FIG. 5, the clutch control mechanism 19 has a heretofore known structure composed of a clutch yoke 39, a clutch cam 44 and a clutch plate 45. The casting control mechanism 22 is a brake mechanism configured to regulate a resistive force to be applied during the rotation of the spool 12. Further, a spool brake device 23 is disposed between the first side plate 7a and the first side cover 6a. The spool brake device 23 is a device configured to brake the spool 12 by means of centrifugal force. The spool brake device 23 is a device configured to inhibit occurrence of backlash in casting.

<Spool and Spool Shaft>

As illustrated in FIG. 4, the spool 12 has a bobbin trunk 12a, a pair of right and left flanges 12b and a boss 12c. The bobbin trunk 12a is a tubular part that the fishing line is wound onto the outer periphery thereof. The flanges 12b are integrally formed on the both axial ends of the bobbin trunk 12a, while respectively protruding to the radially outward. The boss 12c is fixed onto the spool shaft 16 by means of an arbitrary fixation method such as press-fitting. The spool 12 is thereby coupled to the spool shaft 16, while being unitarily rotatable therewith.

As illustrated in FIG. 4, the spool shaft 16 extends outward of the second side cover 6b, while penetrating through the second side plate 7b. One end of the spool shaft 16 is rotatably supported by the bearing 24a accommodated in the bearing accommodating part 8c of the shaft strut portion 8b. On the other hand, the other end of the spool shaft 16 is rotatably supported by a bearing 24b within the fourth boss 6d disposed on the second side cover 6b. Thus, the spool shaft 16 is supported by the reel unit 1 through the bearings disposed in two positions.

The spool shaft 16 has a first shaft part 16a penetrating through the second boss 7g of the second side plate 7b. A clutch pin 20, composing a part of the clutch mechanism 13, is fixed to the first shaft part 16a. The clutch pin 20 composes a part of the clutch mechanism 13. The clutch pin 20 penetrates through the spool shaft 16 along the radial direction of the spool shaft 16, while the both ends thereof protrude from the spool shaft 16 in the radial direction. Similarly to a part of the spool shaft 16 onto which the spool 12 is fixed, the first shaft part 16a of the spool shaft 16, through which the clutch pin 20 penetrates, is formed with a large diameter. The spool shaft 16 has a second shaft part 16b continuing to the first shaft part 16a. The second shaft part 16b has a diameter less than that of the first shaft part 16a. A clearance adjusting part 13a, composing a part of the clutch mechanism 13, is disposed axially between the first shaft part 16a and the second shaft part 16b. The clearance adjusting part 13a is provided for partially reducing a clearance produced between the pinion gear 32 to be described and the spool shaft 16.

<Rotation Transmission Mechanism>

As illustrated in FIG. 3, the rotation transmission mechanism 18 includes the drive shaft 30, a drive gear 31, the pinion gear 32 (see FIGS. 4 and 5), a first gear 33 and a second gear 34. The handle 2 is coupled to the drive shaft 30 in a unitarily rotatable state. The drive gear 31 is mounted to the drive shaft 30. The pinion gear 32 is meshed with the drive gear 31. The first gear 33 is coupled to the drive shaft 30, while being unitarily rotatable therewith. The second gear 34 is meshed with the first gear 33. The second gear 34 reciprocates the level wind mechanism 15 right and left in conjunction with the rotation of the handle 2.

The drive shaft 30 is made of, for instance, stainless alloy. As illustrated in FIGS. 3 and 5, the drive shaft 30 has a brimmed part 30a with a large diameter. The drive shaft 30 is rotatably supported by the reel unit 1 through a bearing 43 and a one-way clutch 40. The bearing 43 is mounted to the first boss 7f of the second side plate 7b. The one-way clutch 40 is mounted to the third boss 6c of the second side cover 6b. The drive shaft 30 is enabled to be rotated only in a fishing-line winding direction by the one-way clutch 40 of a roller type. A ratchet wheel 36 is mounted onto the drive shaft 30, while being unitarily rotatable therewith. The ratchet wheel 36 serves as a drag receiver member for receiving the drag force of the drag mechanism 21. The ratchet wheel 36 is disposed between the drive gear 31 and the brimmed part 30a. The ratchet wheel 36 functions not only as the drag receiver member but also as a clutch returning mechanism configured to return the clutch mechanism 13 from the clutch-off state to the clutch-on state. Further, the ratchet wheel 36 also functions as a pawl-type one-way clutch disposed in alignment with the one-way clutch 40.

As illustrated in FIG. 3, the drive gear 31 is rotatably mounted to the drive shaft 30. A drag plate 37 of the drag mechanism 21 is also mounted to the drive shaft 30, while being unitarily rotatable therewith. Further, a drag nut 3a of the star drag 3 is screwed onto the drive shaft 30. Yet further, the handle 2 is mounted to the tip end of the drive shaft 30, while being unitarily rotatable therewith. A nut 53 is also screwed onto the tip end of the drive shaft 30 in order to fix the handle 2 to the drive shaft 30. On the other hand, the first gear 33 is mounted onto the base end of the drive shaft 30, while being unitarily rotatable therewith. As illustrated in FIG. 4, the second gear 34 is coupled to a warm shaft 15a of the level wind mechanism 15, while being unitarily rotatable therewith.

Figure 6:
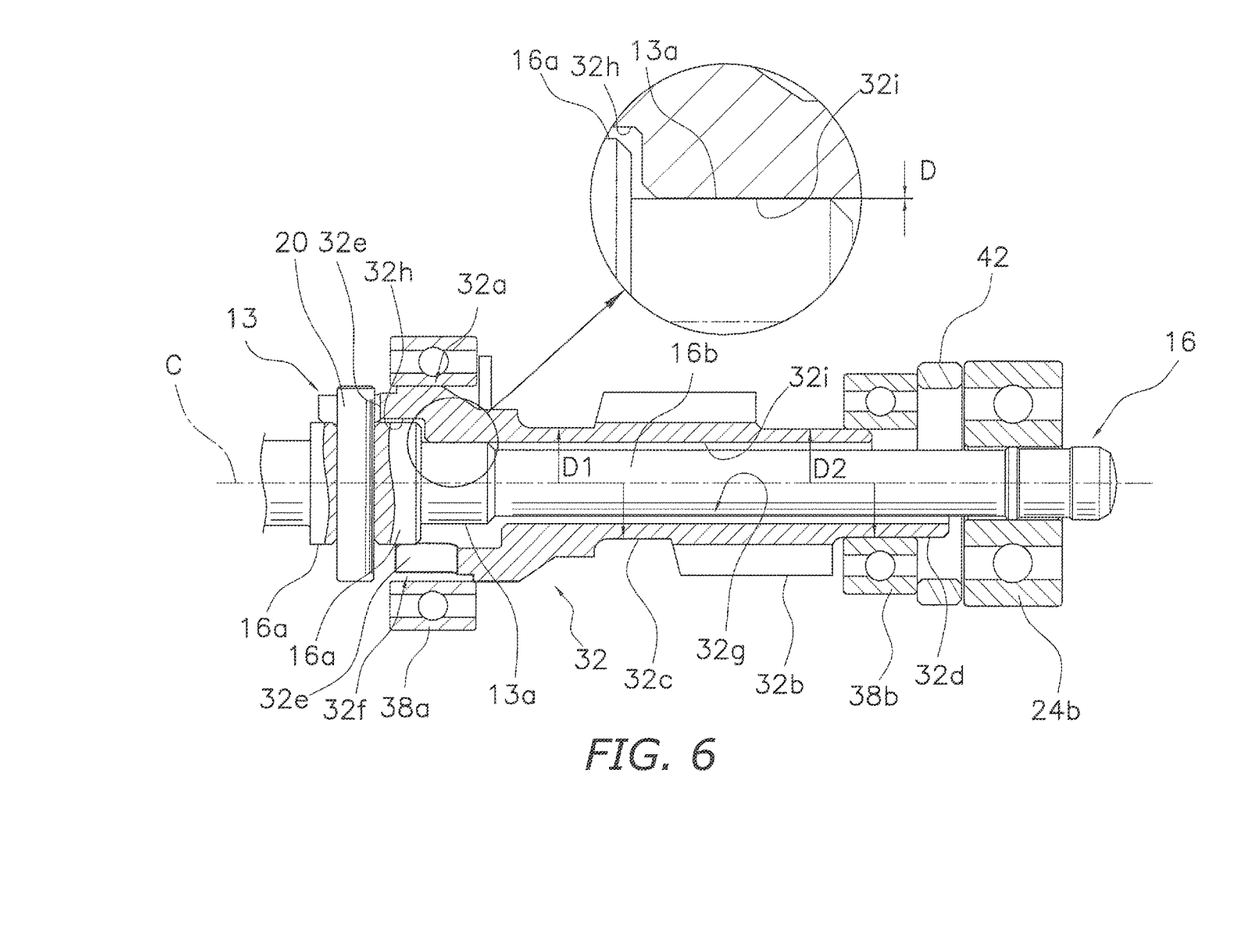
FIG. 6 is a cross-sectional view of a pinion gear in which a spool shaft is disposed.

As illustrated in FIGS. 5 and 6, the pinion gear 32 is a tubular member having a through hole 32g that the spool shaft 16 penetrates through the center thereof. The pinion gear 32 is a member made of metal, for instance, stainless alloy, brass alloy or so forth. It should be noted that in FIG. 6, an upper side of a spool axis C illustrates a position of the pinion gear 32 located when the clutch mechanism 13 is set in the on-state, whereas a lower side of the spool axis C illustrates a position of the pinion gear 32 located when the clutch mechanism 13 is set in the off-state. The through hole 32g has a first aperture part 32h with a large diameter and a second aperture part 32i with a small diameter, which is smaller than that of the first aperture part 32h. The first aperture part 32h is capable of being disposed about the first shaft part 16a of the spool shaft 16 when the clutch mechanism 13 is set in the on-state. The second aperture part 32i is capable of being disposed about the second shaft part 16b of the spool shaft 16. On the other hand, a part of the second aperture part 32i, disposed on the same side as the first aperture part 32h, is capable of being disposed about the clearance adjusting part 13a when the clutch mechanism 13 is set in the on-state.

The both ends of the pinion gear 32 are rotatably supported by the reel unit 1. Specifically, as illustrated in FIG. 4, one end of the pinion gear 32 is rotatably supported by the second boss 7g of the second side plate 7b through a first bearing 38a, whereas the other end of the pinion gear 32 is rotatably supported by the fourth boss 6d of the second side cover 6b through a second bearing 38b. The first bearing 38a and the second bearing 38b compose a part of the clutch mechanism 13. As described above, both ends of the pinion gear 32 are supported by the reel unit 1. Hence, the pinion gear 32 is less likely to slant, and does not make contact with the spool shaft 16. As a result, the rotational resistance of the spool shaft 16 is reduced in casting, and a terminal tackle can be thrown far.

The pinion gear 32 is also movable in a spool shaft direction, while being supported by the reel unit 1 through the first and second bearings 38a and 38b. The pinion gear 32 has a first support part 32a, a gear part 32b, a narrowed part 32c and a second support part 32d.

The first support part 32a is disposed on one end of the pinion gear 32. The first support part 32a is supported by the second boss 7g of the second side plate 7b through the first bearing 38a, while being rotatable and axially movable. The first support part 32a has a clutch engaging part 32f. The clutch engaging part 32f has a plurality of engaging grooves 32e that the clutch pin 20 is engaged therewith. The clutch engaging part 32f is an exemplary engaging part. The engaging grooves 32e are formed along the radial direction of the pinion gear 32. For example, the plural engaging grooves 32e are four grooves that are formed along the radial direction, while intersecting at angular intervals of 90 degrees. The clutch mechanism 13 is mainly composed of the clutch pin 20 and the clutch engaging part 32f having the plural engaging grooves 32e. As described above, the clutch mechanism 13 further includes the clearance adjusting part 13a, the first bearing 38a and the second bearing 38b. The clearance adjusting part 13a is provided for partially reducing a clearance produced between the spool shaft 16 and the second aperture part 32i when the clutch mechanism 13 is set in the on-state. When the clutch mechanism 13 is set in the on-state, the clearance adjusting part 13a is enabled to be disposed inside the second aperture part 32i. By contrast, when the clutch mechanism 13 is set in the off-state, the clearance adjusting part 13a is capable of being disposed inside the first aperture part 32h with a diameter greater than that of the second aperture part 32i. Therefore, only when the clutch mechanism 13 is set in the on-state, a clearance D between the spool shaft 16 and the second aperture part 32i is partially reduced. As illustrated in an enlarged view of FIG. 6, the clearance D preferably falls in a range of greater than or equal to 0.02 mm and less than or equal to 0.15 mm when the clutch mechanism 13 is set in the on-state. The clearance D more preferably falls in a range of greater than or equal to 0.05 mm and less than or equal to 0.10 mm.

The gear part 32b is disposed away from the first support part 32a at an interval. The gear part 32b is capable of being meshed with the drive gear 31. The gear part 32b is formed by an arbitrary type of machining such as hobbing (gear cutting), after processing of a blank (to be the pinion gear 32) is finished except for the gear part 32b and a plated coating is then formed on the blank with the through hole 32g being closed. Therefore, the plated coating is not formed on the gear part 32b.

The narrowed part 32c is disposed between the first support part 32a and the gear part 32b. The outer diameter (D1) of the narrowed part 32c is less than that of the first support part 32a. However, the outer diameter (D1) of the narrowed part 32c is greater than that (D2) of the second support part 32d (i.e., D1>D2). Thus, the outer diameter D1 of the narrowed part 32c disposed between the gear part 32b to be meshed with the drive gear 31 and the clutch engaging part 32f to be coupled to the spool shaft 16 is greater than the outer diameter D2 of the second support part 32d. Therefore, the pinion gear 32 is enhanced in its stiffness, and its rotation transmission efficiency.

The clutch yoke 39, composing a part of the clutch control mechanism 19, is engaged with the narrowed part 32c. The clutch yoke 39 is configured to be located in an off-position when the clutch operating member 17 is set in the clutch-off position depicted with the dashed two-dotted line in FIG. 2. By contrast, the clutch yoke 39 is configured to be moved to an on-position by the pinion gear 32 when the clutch operating member 17 is set in the clutch-on position depicted with the solid line in FIG. 2. The on-position is herein located closer to the spool 12 than the off-position is. Thus, the clutch pin 20 is engaged with the engaging grooves 32e, and the clutch mechanism 13 is set in the on-state. It should be noted that the clutch yoke 39 is urged to the on-position by a pair of coil springs 35.

Thus, the pinion gear 32 composes a part of the rotation transmission mechanism 18. The pinion gear 32 is configured to be rotated in conjunction with the handle 2 for transmitting the rotation of the handle 2 to the spool 12 and be reciprocated in the direction of the spool shaft 16 in response to the operation of the clutch operating member 17. The outer diameter D1 of the narrowed part 32c is greater than the outer diameter D2 of the second support part 32d. Therefore, the pinion gear 32 is enhanced in its stiffness, and becomes less likely to be distorted. The pinion gear 32 is thereby enhanced in its rotation transmission efficiency.

The second support part 32d is disposed on the other end of the pinion gear 32. The second support part 32d is supported by the fourth boss 6d of the second side cover 6b through the second bearing 38b, while being rotatable and axially movable. The second bearing 38b is disposed together with the bearing 24b supporting the spool shaft 16 within the fourth boss 6d, while a spacer 42 is interposed therebetween.

The plated coating is formed on the outer peripheral surface of the first support part 32a, that of the narrowed part 32c, that of the second support part 32d, and that of the clutch engaging part 32f. The plated coating is a fluororesin contained electroless nickel plated coating.

In producing the pinion gear 32 thus structured, a tubular metal blank is machined for forming the first support part 32a (including the clutch engaging part 32f), the narrowed part 32c, the second support part 32d and the through hole 32g except for the gear part 32b to be machined by means of hobbing. The machined blank is then submerged into a plating tank, while the through hole 32g is closed. Subsequently, an electroless plating process is performed for the submerged blank. After the electroless plating processing, the gear part 32b is machined by means of hobbing.

<Drag Mechanism>

In the clutch-on state, the drag mechanism 21 is configured to brake the rotation of the spool 12 in a fishing-line releasing direction through the drive gear 31. The drag force of the drag mechanism 21 is regulated by the star drag 3. As illustrated in FIG. 3, the rotation of the handle 2 and the pressing force of the star drag 3 are transmitted to the drag mechanism 21 through an inner race 40a of the one-way clutch 40. The drag mechanism 21 includes the ratchet wheel 36 and the drag plate 37 (see FIG. 3). The drag plate 37 is coupled to the inner race 40a, while being unitarily rotatable therewith. To make the drive gear 31 smoothly slide against adjacent members in drag actuation, a first drag washer 41a is mounted between the drag plate 37 and the drive gear 31, while a second drag washer 41b is mounted between the drive gear 31 and the ratchet wheel 36. The first and second drag washers 41a and 41b are made of either felt or graphite.

<Casting Control Mechanism>

As illustrated in FIGS. 4 and 5, the casting control mechanism 22 includes a first friction plate 51a, a second friction plate 51b and a brake cap 52. The first and second friction plates 51a and 51b are abutted to the both ends of the spool shaft 16 from axially outside of the spool shaft 16. The brake cap 52 is a member for regulating the abutting pressure of the first and second friction plates 51a and 51b against the spool shaft 16. The first friction plate 51a is disposed inside the brake cap 52. The brake cap 52 is screwed onto the outer peripheral surface of the fourth boss 6d. The second friction plate 51b is mounted to the inside of the shaft strut portion 8b.

<Spool Brake Device>

As illustrated in FIG. 4, the spool brake device 23 includes a rotary member 62, a plurality of (e.g., six) brake shoes 64, a brake drum 66 and a moving mechanism 68. The spool brake device 23 is mounted to the spool shaft 16 and the shaft strut portion 8b. The plurality of brake shoes 64 are elastically engaged with the rotary member 62, while being pivotable and detachable. The brake drum 66 is disposed radially inward of the brake shoes 64, while the outer peripheral surface thereof is contactable to the pivotable brake shoes 64. The moving mechanism 68 is capable of moving and positioning the brake drum 66 relatively to the brake shoes 64 in the axial direction of the spool shaft 16.

The rotary member 62 is a roughly circular member made of synthetic resin (e.g., polyamide resin, polyacetal resin, etc.). The rotary member 62 is fixed onto the spool shaft 16 by means of press-fitting. The rotary member 62 is axially positioned by the spool shaft 16. Further, the rotary member 62 is configured to be rotated in conjunction with the rotation of the spool 12, while being fixed onto the spool shaft 16. When the spool 12 is rotated, a centrifugal force acts on the brake shoes 64. Each brake shoe 64 thereby pivots about a pivot shaft 63c in the counterclockwise direction in FIG. 4. Then, the spool 12 is braked by friction between the brake shoes 64a and the brake drum 66. At this time, the braking force depends on the gravity center position and the pivot angle of each brake shoe 64 in the contact position. Therefore, the braking force is adjustable by causing the moving mechanism 68 to adjust the position of the brake drum 66. It should be noted that the position of the brake drum 66 is adjustable by turning an operating member 60.

In the clutch mechanism 13 of the dual-bearing reel 100 thus structured, a clearance is configured to be reduced between the pinion gear 32 and the spool shaft 16 when the clutch mechanism 13 is set in the on-state. Hence, intermittent contacts between the clutch pin 20 and the clutch engaging part 32f, attributed to relative slanting of the pinion gear 32 and the spool shaft 16, become less likely to be caused. Therefore, the handle 2 becomes smoothly rotatable, and click sounds by intermittent contacts become less likely to be produced.

<Features>

The aforementioned exemplary embodiment can be expressed as follows.

(A) The dual-bearing reel 100 is a type of reel configured to forwardly reel out a fishing line. The dual-bearing reel 100 includes the reel unit 1, the handle 2, the spool 12 and the clutch mechanism 13. The handle 2 is rotatably mounted to a lateral part to the reel unit 1. The spool 12 is rotatably supported by the reel unit 1. The clutch mechanism 13 is switchable between the on-state of coupling the handle 2 and the spool 12 and the off-state of decoupling the handle 2 and the spool 12. More specifically, the clutch mechanism 13 is a mechanism configured to be switchable between the on-state of coupling the handle 2 rotatably mounted to the lateral part of the reel unit 1 and the spool 12 rotatably supported by the reel unit 1 and the off-state of decoupling the handle 2 and the spool 12. The clutch mechanism 13 includes the clutch pin 20, the pinion gear 32, the first bearing 38a, the second bearing 38b and the clearance adjusting part 13a. The clutch pin 20 is disposed in and radially protruded from the spool shaft 16 to which the spool 12 is mounted in a unitarily rotatable state. The pinion gear 32 has the through hole 32 enabling the spool shaft 16 to penetrate therethrough and the clutch engaging part 32f capable of being engaged with the clutch pin 20. The pinion gear 32 is rotatable in conjunction with the rotation of the handle 2, and is axially movable to the on-position and the off-position. The on-position causes the pinion gear 32 to be engaged with the clutch pin 20 and be unitarily rotatable with the spool shaft 16, whereas the off-position causes the pinion gear 32 to be disengaged from the clutch pin 20. The first bearing 38a serves as a member through which the pinion gear 32 is rotatably and axially movably supported by the reel unit 1. The first bearing 38a is disposed on the outer peripheral surface of the first support part 32a of the pinion gear 32. The first support part 32a is herein disposed on the same side as the spool 12. The second bearing 38b serves as a member through which the pinion gear 32 is rotatably and axially movably supported by the reel unit 1. The second bearing 38b is disposed on the outer peripheral surface of the second support part 32d of the pinion gear 32. The second support part 32d is herein disposed on the opposite side of the first support part 32a. The clearance adjusting part 13a is formed on at least either of the inner peripheral surface of the through hole 32g and the outer peripheral surface of the spool shaft 16, while being located between the inner peripheral surface of the through hole 32g and the outer peripheral surface of the spool shaft 16. The clearance adjusting part 13a is configured to partially reduce the clearance D between the inner peripheral surface of the through hole 32g and the outer peripheral surface of the spool shaft 16 in the position of the clearance adjusting part 13a in the on-state of the clutch mechanism 13.

In the clutch mechanism 13 of the dual-bearing reel 100, the clearance between the inner peripheral surface of the pinion gear 32 and the outer peripheral surface of the spool shaft 16 is configured to be partially reduced by the clearance adjusting part 13a in the on-state of the clutch mechanism 13 that the clutch pin 20 of the spool shaft 16 is engaged with the clutch engaging part 32f of the pinion gear 32. Thus, the clearance between the pinion gear 32 and the spool shaft 16 is reduced in the on-state of the clutch mechanism 13. Intermittent contact between the clutch pin 20 and the clutch engaging part 32f, which is attributed to relative slanting of the pinion gear 32 and the spool shaft 16, becomes less likely. By contrast, in the off-state of the clutch mechanism 13, the clearance between the pinion gear 32 and the spool shaft 16 is not partially reduced in the position of the clearance adjusting part 13a. Hence, casting is not negatively affected by the off-state of the clutch mechanism.

(B) The clearance adjusting part 13a may be formed on a region, located on the same side as the spool 12, of the outer peripheral surface of the spool shaft 16. In this structure, the clearance adjusting part 13a is formed on the spool shaft 16. Hence, the clearance adjusting part 13a can be easily formed, while the through hole 32g of the pinion gear 32 can be simply formed.

(C) The spool shaft 16 may have the first shaft part 16a and the second shaft part 16b. The first shaft part 16a enables the clutch pin 20 to penetrate therethrough. The second shaft part 16b has a diameter less than that of the first shaft part 16a, and extends from the first shaft part 16a in the direction away from the spool 12. Further, the through hole 32g may have the first aperture part 32h and the second aperture part 32i. The first aperture part 32h enables the first shaft part 16a to be disposed therein in the on-state of the clutch mechanism 13. The second aperture part 32i has a diameter less than that of the first aperture part 32h, and enables the second shaft part 16b to be disposed therein in the on-state of the clutch mechanism 13. Yet further, the clearance adjusting part 13a may be formed on a region, located on the same side as the first shaft part 16a, of the outer peripheral surface of the second shaft part 16b. The clearance adjusting part 13a may have a diameter that is greater than the diameter of the second shaft part 16b and is less than the diameter of the second aperture part 32i. According to the structure, in the on-state of the clutch mechanism 13, the second shaft part 16b and the second aperture part 32i are configured to be opposed to each other, while the clearance adjusting part 13a, formed on the first-shaft-part-16a side region of the outer peripheral surface of the second shaft part 16b, is configured to be opposed to the second aperture part 32i. Thus, the clearance between the clearance adjusting part 13a and the second aperture part 32i becomes less than the clearance between the second shaft part 16b and the second aperture part 32i. By contrast, in the off-state of the clutch mechanism 13, the first aperture part 32h is enabled to be disposed about the clearance adjusting part 13a, whereas the second aperture part 32i is enabled to be disposed about the second shaft part 16b. In the structure, a large clearance is produced between the pinion gear 32 and the spool shaft 16. The spool shaft 16 is thereby less likely to make contact with the pinion gear 32. Thus, the rotational resistance of the spool shaft 16 is reduced in casting, and the terminal tackle can be thrown far.

(D) The clutch engaging part 32f may have the plural engaging grooves 32e formed on the end surface of the pinion gear, while being circumferentially aligned. The end surface is herein disposed on the same side as the spool 12. At least two of the engaging grooves 32e are configured to be engaged with the clutch pin 20 in the on-state of the clutch mechanism 13. In the structure, the clutch pin 20 can be engaged with the engaging grooves 32e in a plurality of rotational phases of the pinion gear 32.

(E) In the position of the clearance adjusting part 13a, the clearance D between the inner peripheral surface of the through hole 32g and the outer peripheral surface of the spool shaft 16 is configured to fall in a range of greater than or equal to 0.02 mm and less than or equal to 0.15 mm in the on-state of the clutch mechanism 13. In the structure, the clearance formed in the position of the clearance adjusting part 13a is small. Hence, even when load acting on the spool 12 varies, the rotation of the spool shaft 16 becomes further less likely to vary with respect to the rotation of the pinion gear 32. Therefore, even when load varies in winding the fishing line, it is possible to further inhibit occurrence of intermittent contacts between the clutch pin 20 and the engaging grooves 32e.

(F) In the position of the clearance adjusting part 13a, the clearance between the inner peripheral surface of the through hole 32g and the outer peripheral surface of the spool shaft 16 in the off-state of the clutch mechanism 13 is configured to be greater than the clearance between the inner peripheral surface of the through hole 32g and the outer peripheral surface of the spool shaft 16 in the on-state of the clutch mechanism 13. In the structure, the clearance is increased in the off-state of the clutch mechanism 13. Hence, the rotational resistance of the spool shaft 16 is reduced in casting, and the terminal tackle can be thrown far.

OTHER EXEMPLARY EMBODIMENTS

One exemplary embodiment of the present invention has been described above. However, the present invention is not limited to the aforementioned exemplary embodiment, and a variety of changes can be made without departing from the scope of the present invention. Especially, a plurality of exemplary embodiments and modifications described in the present specification can be arbitrarily combined on an as-needed basis.

Figure 7:
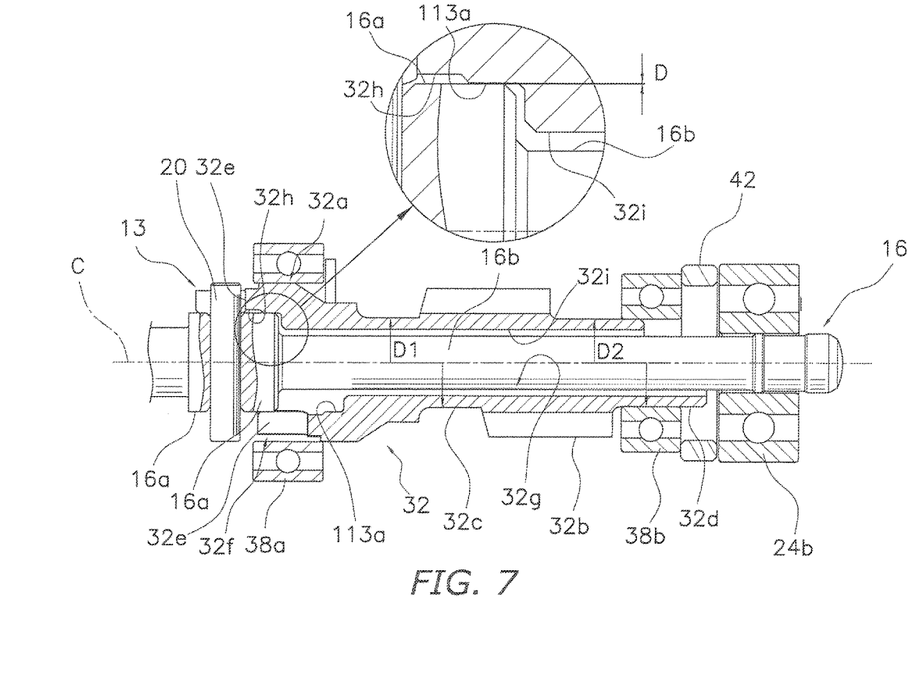
FIG. 7 is a diagram corresponding to FIG. 6 according to another exemplary embodiment.

(a) in the aforementioned exemplary embodiment, the clearance adjusting part 13a is disposed between the second shaft 16b and the second aperture part 32i. However, the present invention is not limited to the structure. For example, a clearance adjusting part 113a may be disposed on at least either of: a region, located on the same side as the second aperture part 32i, of the first aperture part 32h; and a region, located on the same side as the second shaft part 16b, of the first shaft part 16a. In FIG. 7, the clearance adjusting part 113a is disposed not on the spool shaft 16 but on the first aperture part 32h of the pinion gear 32. Thus, the clearance adjusting part 113a may be disposed on either of the spool shaft 16 and the pinion gear 32. Alternatively the clearance adjusting part 113a may be disposed on both of the spool shaft 16 and the pinion gear 32.

The inner diameter of the clearance adjusting part 113a is greater than the outer diameter of the first shaft part 16a and less than the inner diameter of the first aperture part 321h. As illustrated in the enlarged view of FIG. 7, the clearance D between the inner diameter of the clearance adjusting part 113a and the outer diameter of the first shaft part 16a is set to fall in a range similar to that set in the aforementioned exemplary embodiment. Preferably, the clearance D is set to fall in a range of greater than or equal to 0.02 mm and less than or equal to 0.15 mm. More preferably, the clearance D is set to fall in a range of greater than or equal to 0.05 mm and less than or equal to 0.10 mm. The exemplary embodiment herein described can also achieve advantageous effects similar to those achieved by the aforementioned exemplary embodiment.

(b) In the aforementioned exemplary embodiment, the drive gear 31 is rotatably mounted to the drive shaft 30. However, the present invention is also applicable to such a dual-bearing reel that a drive gear is mounted to a drive shaft while being unitarily rotatable therewith.

(c) In the aforementioned exemplary embodiment, the present invention has been explained by exemplifying a low-profile dual-bearing reel. However, the present invention is also applicable to a pinion gear to be embedded in a round dual-bearing reel, an electric reel or a single-bearing reel.

(d) In the aforementioned exemplary embodiment, the clutch pin 20 penetrates through the spool shaft 16, while the both ends thereof radially protrude from the spool shaft 16. However, the both ends of the clutch pin 20 may not penetrate through the spool shaft 16, and only one end thereof may radially protrude from the spool shaft 16. Alternatively, the both ends of the clutch pin 20, penetrating through the spool shaft 16, may have different diameters. In the both structures, the clutch pin 20 is configured to be engaged with only one of the plural engaging grooves 32e. Thus, even when the clutch pin 20 intermittently makes contact with one of the grooves 32e, the frequency of intermittent contacts will be reduced half. Consequently, sounds of intermittent contacts become less annoying for an angler.

What is claimed is:

1. A dual-bearing reel being configured to forwardly reel out a fishing line, comprising:
   a reel unit;
   a handle rotatably mounted to a lateral part of the reel unit;
   a spool shaft;
   a spool rotatably supported by the reel unit, and being mounted to the spool shaft in a unitarily rotatable state; and
   a clutch mechanism switchable between an on-state that couples the handle and the spool and an off-state that decouples the handle and the spool,
   the clutch mechanism including
      a clutch pin disposed in and radially protruding from the spool shaft,
      a pinion gear having a through hole enabling the spool shaft to penetrate therethrough and an engaging part capable of being engaged with the clutch pin, the pinion gear being rotatable in conjunction with rotation of the handle, the pinion gear being axially movable to an on-position and an off-position, the on-position configured to cause the pinion gear to be engaged with the clutch pin and be unitarily rotatable with the spool shaft, the off-position configured to cause the pinion gear to be disengaged from the clutch pin,
      a first bearing through which the pinion gear is rotatably and axially movably supported by the reel unit, the first bearing being disposed on an outer peripheral surface of a first end of the pinion gear, the first end being disposed on the same side as the spool,
      a second bearing through which the pinion gear is rotatably and axially movably supported by the reel unit, the second bearing being disposed on an outer peripheral surface of a second end of the pinion gear, the second end being disposed on the opposite side of the first end, and
      a clearance adjusting part disposed on an inner peripheral surface of the through hole while being located between the inner peripheral surface of the through hole and the outer peripheral surface of the spool shaft, the clearance adjusting pail being configured to partially reduce a clearance between the inner peripheral surface of the through hole and the outer peripheral surface of the spool shaft at a position for an entirety of the clearance adjusting part in the on-state of the clutch mechanism relative to the off-state.

2. The dual-bearing reel according to claim 1, wherein the clearance adjusting part is disposed on a region of the outer peripheral surface of the spool shaft, the region being located on the same side as the spool.

3. The dual-hearing reel according to claim 2, wherein the spool shaft has a first shaft part and a second shaft part, the first shaft part enabling the clutch pin to penetrate therethrough, the second shaft part having a diameter less than a diameter of the first shaft part, the second shaft part extending from the first shaft part in a direction away from the spool,
the through hole has a first aperture part and a second aperture part, the first aperture part enabling the first shaft part to be disposed therein in the on-state of the clutch mechanism, the second aperture part having a diameter less than a diameter of the first aperture part, the second aperture part enabling the second shaft part to be disposed therein in the on-state of the clutch mechanism, and
the clearance adjusting part is disposed in a region of an outer peripheral surface of the second shaft part, the region being located on the same side as the first shaft part, the clearance adjusting part having a diameter greater than the diameter of the second shaft part and less than the diameter of the second aperture part.

4. The dual-bearing reel according to claim 3, wherein the engaging part has a plurality of engaging grooves, the engaging grooves being disposed on an end surface of the pinion gear and being circumferentially aligned, the end surface being disposed on the same side as the spool, at least two engaging grooves of the plurality of engaging grooves being configured to be engaged with the clutch pin in the on-state of the clutch mechanism.

5. The dual-hearing reel according to claim 3, wherein the clearance adjusting part is configured to partially reduce the clearance between the inner peripheral surface of the through hole and the outer peripheral surface of the spool shaft, such that the clearance falls in a range of greater than or equal to 0.02 mm and less than or equal to 0.15 mm in the on-state of the clutch mechanism.

6. The dual-bearing reel according to claim 3, wherein the clearance adjusting part is configured to partially reduce the clearance between the inner peripheral surface of the through hole and the outer peripheral surface of the spool shaft in the off-state of the clutch mechanism such that the clearance is greater than the clearance between the inner peripheral surface of the through hole and the outer peripheral surface of the spool shaft in the on-state of the clutch mechanism.

7. The dual-bearing reel according to claim 2, wherein the engaging part has a plurality of engaging grooves, the engaging grooves being disposed on an end surface of the pinion gear and being circumferentially aligned, the end surface being disposed on the same side as the spool, at least two engaging grooves of the plurality of engaging grooves being configured to be engaged with the clutch pin in the on-state of the clutch mechanism.

8. The dual-bearing reel according to claim 2, wherein the clearance adjusting part is configured to partially reduce the clearance between the inner peripheral surface of the through hole and the outer peripheral surface of the spool shaft, such that the clearance falls in a range of greater than or equal to 0.02 mm and less than or equal to 0.15 mm in the on-state of the clutch mechanism.

9. The dual-bearing reel according to claim 2, wherein the clearance adjusting part is configured to partially reduce the clearance between the inner peripheral surface of the through hole and the outer peripheral surface of the spool shaft in the off-state of the clutch mechanism such that the clearance is greater than the clearance between the inner peripheral surface of the through hole and the outer peripheral surface of the spool shaft in the on-state of the clutch mechanism.

10. The dual-bearing reel according to claim 1, wherein the engaging part has a plurality of engaging grooves, the engaging grooves being disposed on an end surface of the pinion gear and being circumferentially aligned, the end surface being disposed on the same side as the spool, at least two engaging grooves of the plurality of engaging grooves being configured to be engaged with the clutch pin in the on-state of the clutch mechanism.

11. The dual-bearing reel according to claim 10, wherein the clearance adjusting part is configured to partially reduce the clearance between the inner peripheral surface of the through hole and the outer peripheral surface of the spool shaft, such that the clearance falls in a range of greater than or equal to 0.02 mm and less than or equal to 0.15 mm in the on-state of the clutch mechanism.

12. The dual-bearing reel according to claim 10, wherein the clearance adjusting part is configured to partially reduce the clearance between the inner peripheral surface of the through hole and the outer peripheral surface of the spool shaft in the off-state of the clutch mechanism such that the clearance is greater than the clearance between the inner peripheral surface of the through hole and the outer peripheral surface of the spool shaft in the on-state of the clutch mechanism.

13. The dual-bearing reel according to claim 1, wherein the clearance adjusting part is configured to partially reduce the clearance between the inner peripheral surface of the through hole and the outer peripheral surface of the spool shaft, such that the clearance falls in a range of greater than or equal to 0.02 mm and less than or equal to 0.15 mm in the on-state of the clutch mechanism.

14. The dual-bearing reel according to claim 13, wherein the clearance adjusting part is configured to partially reduce the clearance between the inner peripheral surface of the through hole and the outer peripheral surface of the spool shaft in the off-state of the clutch mechanism such that the clearance is greater than the clearance between the inner peripheral surface of the through hole and the outer peripheral surface of the spool shaft in the on-state of the clutch mechanism.

15. The dual-bearing reel according to claim 1, wherein the clearance adjusting part is configured to partially reduce the clearance between the inner peripheral surface of the through hole and the outer peripheral surface of the spool shaft in the off-state of the clutch mechanism such that the clearance is greater than the clearance between the inner peripheral surface of the through hole and the outer peripheral surface of the spool shaft in the on-state of the clutch mechanism.

\* \* \* \* \*